Oct. 6, 1936.  L. L. SCHAUER  2,056,908
MULTIPLE HYDRAULIC ROTOR DRIVE FOR DRILL SPINDLES
Filed June 14, 1933  3 Sheets-Sheet 1
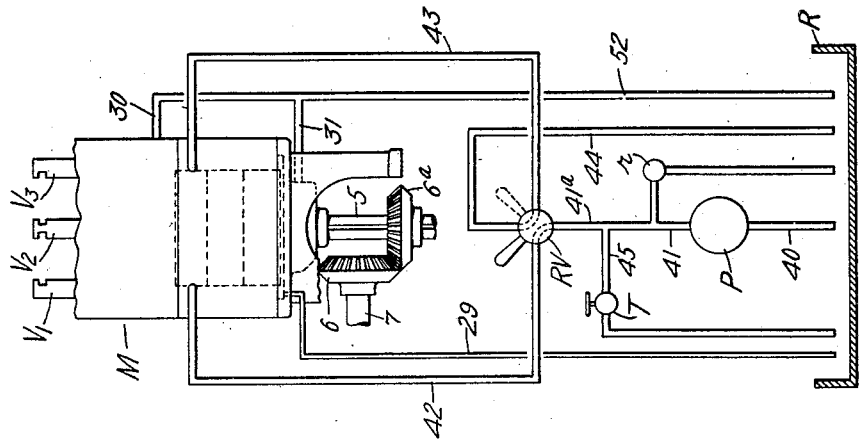
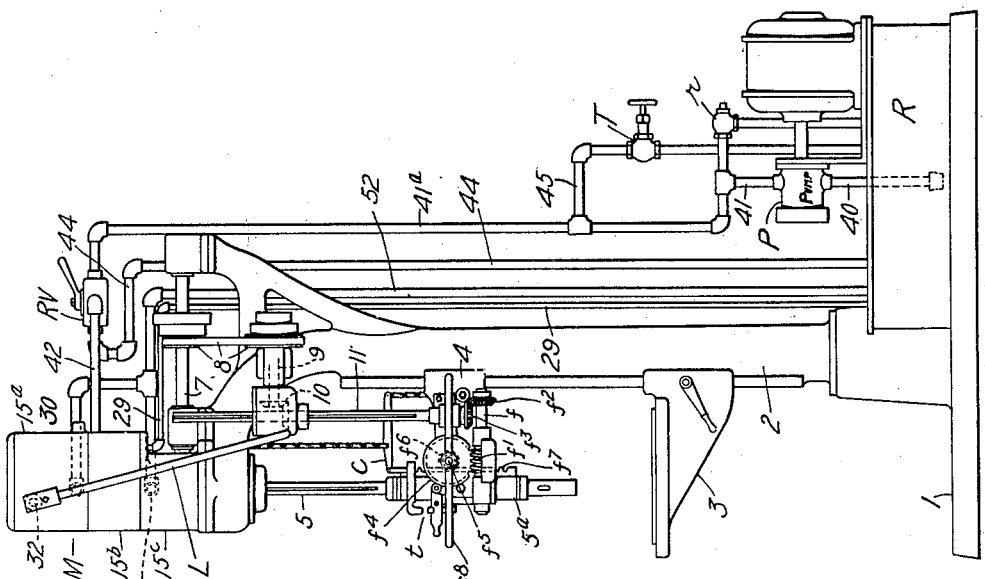
INVENTOR-
Lawrence Lee Schauer
BY
Nathan, Bowman & Helfrich
ATTORNEYS Oct. 6, 1936.   L. L. SCHAUER   2,056,908
MULTIPLE HYDRAULIC ROTOR DRIVE FOR DRILL SPINDLES
Filed June 14, 1933   3 Sheets-Sheet 2
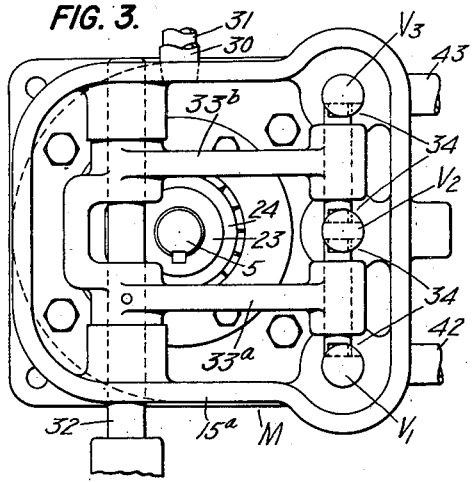
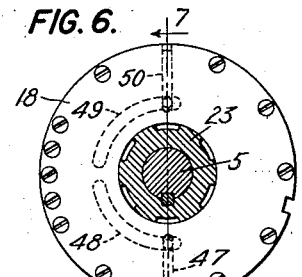
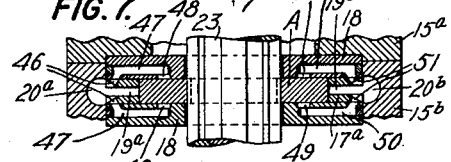
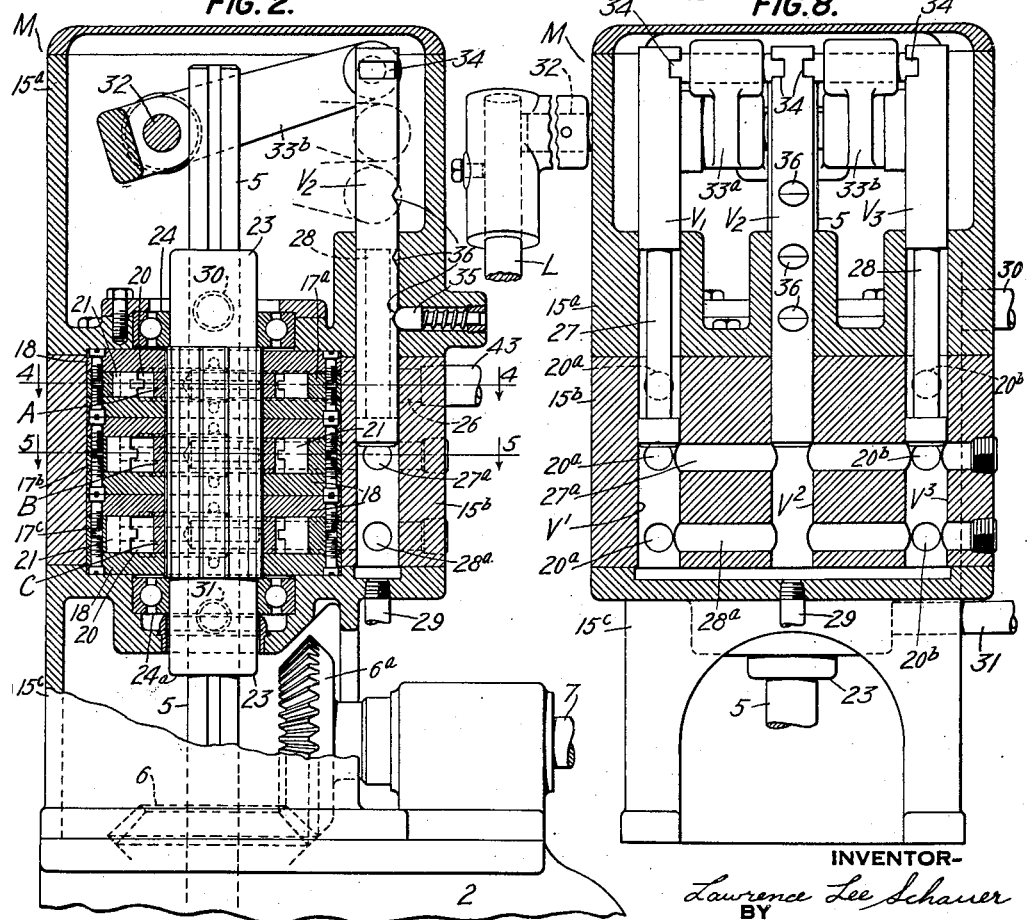
INVENTOR—
Lawrence Lee Schauer
BY
Nathan, Bowman & Helfrich
ATTORNEYS Patented Oct. 6, 1936

2,056,908

UNITED STATES PATENT OFFICE 2,056,908

MULTIPLE HYDRAULIC ROTOR DRIVE FOR DRILL SPINDLES

Lawrence Lee Schauer, Wyoming, Ohio, assignor to The Cincinnati Bickford Tool Company, Cincinnati, Ohio, a corporation of Ohio Application June 14, 1933, Serial No. 675,652

8 Claims. (Cl. 60—53)

This invention relates to improvements in hydraulic transmissions and concerns more particularly the rotation of a machine tool element by means of hydraulic pressure.

Other objects and advantages will be in part indicated in the following description and in part rendered apparent therefrom in connection with the annexed drawings.

In the attainment of the objectives of this invention, it is proposed to construct a motor unit made up of a casing and a plurality of rotor elements of various sizes and volumetric capacities and to utilize substantially the entire output of the supply pump or other source of supply fluid in effecting various motor speeds and, in this way, obtain maximum efficiency.

In the case of a drilling machine, for example, the element driven will usually be the drill spindle, and the motor unit, therefore, is preferably splined or keyed directly thereto in such manner as to permit movement of the spindle in an axial direction under the action of suitable feed mechanism while the spindle is being driven by the hydraulic motor.

Selector valve means are provided for effecting major speed changes and which, when placed in one position, directs the supply fluid to but one of the rotors thereby to drive same and effect a relatively high spindle speed, or if the valve is set in another position two rotors are actuated by the same volume of oil and a different rate of spindle movement ensues; or if the valve is in a third position a third rotor is connected into the system and a third spindle speed is obtained. The more rotors that are connected in parallel the more slow will be the driven speed and conversely.

In addition to the above mentioned selector valve it is proposed to incorporate means for regulating the rate of flow in the motor supply line so that changes in speed may be effected intermediate those produced by the selector valve and thus render the mechanism adaptable to a wide range of speeds.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is an illustration of a representative type of machine tool incorporating the present invention.

Fig. 2 is an enlarged detail, in vertical section, of the motor unit.

Fig. 3 is a plan view of the unit with the cover removed.

Fig. 6 is a plan view of one of the rotors and rotor valve plates, and Fig. 7 is a sectional view of same taken along line 7—7 of Fig. 6.

Fig. 8 is a sectional view of the selector valves and oil circulating valve which together control the flow of oil through and within the motor unit.

Fig. 9 is a circuit diagram of the hydraulic system.

Figure 4:
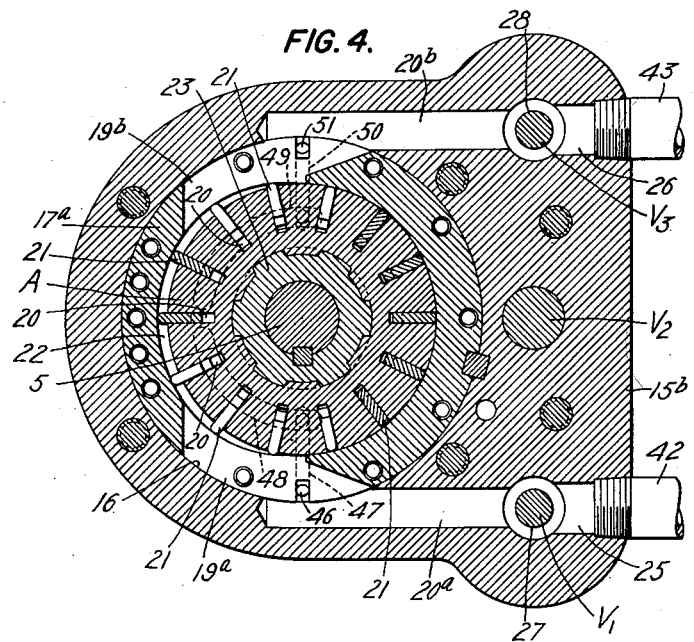
Figs. 4 and 5 are horizontal sectional views of the unit taken along lines 4—4, 5—5 respectively of Fig. 2.

Referring now more particularly to Fig. 1 of the drawings, a representative type of drilling machine is illustrated and to which this invention is peculiarly adapted. In general, the machine comprises a base or support 1 and an upstanding column 2 upon which a work support 3 and a tool head 4 are adjustably mounted. The upper end of the column 2 has mounted thereon the hydraulic driving motor unit M that rotates the spindle 5 and which will later be explained in greater detail. The motive power to effect feed movements of the spindle is taken from the spindle as by means of the bevel gears 6 and 6ᵃ and which through shaft 7, change speed mechanism 8, shaft 9, bevel gears 10 rotates the power feed shaft 11 in a forward or reverse direction depending upon the direction of rotation of the spindle.

The lower end of the feed shaft is journaled in the adjustable head 4 and is operatively connected with the spindle feed mechanism also carried by the head. The features of this portion of a suitable spindle feed means are set forth in greater clearness in United States Patent No. 1,746,265 to which reference may be had for further details. Briefly, it includes a swing or drop shaft $f$ upon which is mounted a worm gear $f_1$ and a bevel gear $f_2$. The gear $f_2$ engages a gear $f_3$ on the feed shaft and is driven thereby. When the drop shaft $f$ is moved and latched into power feed position, the gear $f_1$ rotates worm wheel $f_4$ which in turn rotates a pinion shaft $f_5$. The inner end of the pinion shaft is provided with a pinion $f_6$ that meshes with rack teeth $f_7$ formed upon the spindle sleeve 5ᵃ and in this way the spindle may be elevated or lowered by power. Tripping mechanism, indicated generaly as $t$ is provided for disconnecting the worm $f_1$ from the worm wheel $f_4$ automatically when the spindle has been fed the proper distance. A hand wheel or lever $f_8$ secured to the shaft $f_5$ provides means for effecting feed or traverse movements of the spindle which is at all times counterweighted by the mechanism c. The counterweighting mechanism c, it will be noted, is arranged to counteract the combined weight of the spindle and head or of the spindle separately.

The hydraulic driving motor M for the spindle is mounted on the column at the upper end thereof and in axial alignment with the tool spindle 5, and comprises a 3-part casing $15^a$, $15^b$, and $15^c$, the upper and lower sections $15^a$ and $15^c$ providing the bearings for supporting the upper end of the shaft 5 and other mechanisms later to be referred to, and the center section $15^b$ providing the motor housing proper within which a plurality of rotors A, B, and C are contained.

Each of the rotors, A, B, and C is splined or otherwise secured to a non-translatable sleeve member 23 which, in turn, has a keyed or splined connection with the spindle shaft 5, the ends of the sleeve 23 being rotatably mounted in journal bearings 24 and $24^a$ provided by the upper and lower sections $15^a$ and $15^c$ of the motor unit. In this way rotary movement of the rotor or rotors is transmitted directly to the spindle shaft, the latter being mounted as to be freely movable endwise in the sleeve 23 under the action of the manual or power feed mechanisms hereinbefore mentioned to effect the "feed" action.

Referring to Figs 2, 4, 5, and 6, it will be noted, that the motor housing $15^b$ is formed with a central aperture 16 within which are keyed or otherwise secured a plurality of slotted ring members $17^a$, $17^b$, and $17^c$. Each of these rings is isolated from the one adjacent by grooved discs 18 and in effect provides a single cylinder for the vanes of its respective rotor. Each ring is also provided with intake and discharge ports or slots $19^a$ and $19^b$ oppositely disposed and in registry with intake and discharge channels $20^a$ and $20^b$ respectively that are formed in the housing $15^b$.

Figure 5:
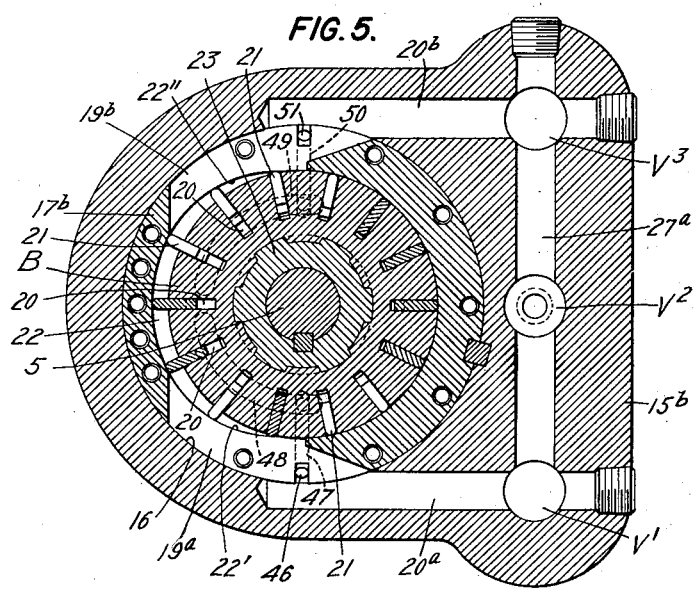

Figs. 4 and 5 illustrate more clearly the construction of the rotors and arrangement of ports etc., Fig. 4 representing a section through the A rotor and Fig. 5 a section through the B rotor. Referring to Figs. 2 and 5, it will be seen, that the rotor B comprises a circular shaped disc of substantial thickness and which is provided with a purality of radially disposed slots 20. Each slot is provided with a reciprocably mounted blade member 21 of the same width as the rotor element.

A section of the inner surface of the ring $17^b$ is enlarged beyond the periphery of the disc B thereby forming a chamber or cavity 22 between the rotor and the ring within which the vanes or pistons 21 are adapted to be cyclically extended, by means later to be described. The near ends of the slots $19^a$ and $19^b$ are spaced apart a distance slightly greater than the distance between, at least, two of the blades 21 in the rotor so that there will always be one blade projecting into the cavity 22 preventing direct communication between the inlet and discharge ports $19^a$ and $19^b$ as the rotor turns.

Each end wall of the arcuate cavity 22 is inclined as at 22' and 22" to permit the blades 21 to move without shock into and out of their effective working positions.

To drive the rotor fluid under pressure is directed into conduit $20^a$ and from there it flows through slot $19^a$ into expansion chamber 22 behind one of the blades 21. The continued application of the fluid pressure acting against that portion of the vane 21 exposed, moves the vane forward in the chamber 22 until the next following vane closes off or passes the end of the intake slot $19^a$. The succeeding vane then becomes subjected to the action of the incoming pressure fluid and continues to turn the rotor. When the preceding blade has been moved a distance sufficient to uncover port $19^b$ the fluid trapped between the successive vanes is permitted to discharge therein and as the rotor advances further the vane is cammed inwardly by the inclined walls 22" and retained in its retracted position by the inner wall of the ring $17^b$. After the succeeding vanes have been moved in this manner the first vane reaches the inclined wall 22' where it once more moves outwardly to its effective working position and the cycle is again repeated.

During a complete revolution of a rotor supplied with a plurality of vanes as shown, each vane, it will be noted, not only acts as a piston moving in the work chamber 22 but each vane also partakes of the functions of a valve so that proper and timely valve action is automatically obtained between the common intake and discharge ports.

The amount or quantity of fluid transferred from the intake port to the discharge port for each revolution of the rotor, will, with a fourteen vane rotor, be fourteen times the volumetric capacity of the chamber 22 between two vanes, for a five vane rotor, five times the capacity of the chamber, for a nine vane rotor, nine times the capacity and so on; and if the rate of flow of fluid directed to the intake conduit $20^a$ is volumetrically constant it follows that the rate of movement of the rotor will be $$R = \frac{Q}{VN}$$

where R represents the rate in revolutions per minute, Q represents the quantity supplied in cubic inches per minute, V the volume of one of the chambers between two blades, and N the number of vanes or blades.

Variations in rate of rotation may be effected in various ways, such as, for example, reducing the rate of delivery of the pump or by-passing a portion of the flow through a pressure relief valve, but as these methods reduce the efficiency of the motor unit and result in large power losses because of friction and heating of the oil, such arrangements are not entirely satisfactory especially so in installations requiring a wide range of speeds. It is the object of this invention to provide a structure that may be driven at various preselected speeds without the ill effects mentioned above.

To this end I have arranged a plurality of rotors on the spindle shaft and provide valve means for selectively directing the supply fluid to as many as desired. By arranging the valve in such manner as to connect at will two or more rotors in parallel the amount or quantity of fluid supplied to any one rotor is materially lessened and a reduction in rate of movement of the driven shaft results. If two rotors of equal displacement or capacity are connected in parallel the new rate will be half that of one rotor; if three rotors are in parallel the new rate will be reduced to one third the rate of one rotor or two thirds the rate of two rotors; four rotors will produce a rate one fourth the rate of one rotor and three fourths the rate of three rotors, and so on.

The more rotors connected to the supply line the greater is the reduction in speed of the driven shaft and, it will be observed, each reduction in speed of the driven shaft is accompanied by a proportionate increase in torque or turning power of the shaft. In drilling machine applications this is particularly advantageous in that the larger drills which should be driven at reduced or slow speeds should also have increased power instead of reduced power and inasmuch as there is no by-passing of fractions of the propelling medium under the increased pressures there is no loss of power resulting from that source.

The above applies only to the major changes in spindle speeds and is based upon the assumption that all of the rotors are of equal size and volumetric capacity. However, in such cases wherein it is desired to obtain various spindle speeds other than in simple harmonic progression, accompanied by disproportionate changes in spindle torque, it is proposed to connect various rotors of which the working areas of the respective vanes differ in size.

Referring to Fig. 2, let it be assumed that the working surface of the vane 21 in the work chamber 22 of rotor A represents a given area, it will then be noted that the effective area of the vane in the work chamber of rotor B is somewhat larger. Consequently, the fluid pressure acting upon the larger piston-like area will set up a greater turning moment upon the driven shaft than will the same pressure acting upon the smaller vane area of rotor A. And when both rotors A and B are connected in parallel the total torque on the spindle shaft 5 is the combined force of the small rotor A and the large rotor B, and thus there may be effected major changes in spindle speed which are disproportionate to each other and to the ultimate power value in the output shaft.

For larger and heavier classes of work a still further increase in turning power is desirable and to accomplish that end the diameters of the rotors may be varied as will now be explained.

Referring to Figs. 2, 4, and 5 it will be observed that the vanes of the rotor B, in addition to the fact that they are of larger effective area than the vances of rotor A, are radially disposed further from the axis of rotation. As a consequence, the unit force acting upon the vanes of rotor B produces a greater turning force upon the spindle shaft 5 than does the same unit force acting upon the vanes of rotor A.

As before explained, in drilling machine tools particularly, the larger tools should be driven at slow speeds but with increased power, and by arranging a multiplicity of rotors of various sizes and capacities in the manner set forth above, the spindle may be rotated at various predetermined speeds, each one of which will be accompanied by change in power value commensurate with the increased or decreased speed.

In the drawings but three rotors, A, B, and C are depicted which will serve to illustrate the principles of this invention but it will be understood, of course, that any number of rotors may be employed to give the desired range of spindle speeds.

The coupling of the various rotors may be effected in any suitable manner. I have preferred, however, to construct the unit with a selector valve built into the main casing so that any leakage that may occur about the rotors or valve takes place inside the main casing where it may serve as a lubricant and thereafter be drawn off as explained later.

Referring to Figs. 2, 4, and 8 the inlet and outlet ports of the motor unit are designated as 25 and 26 respectively, each of which communicates directly with an improved form of selector valve means. This valve means comprises three plungers $V_1$, $V_2$, $V_3$ arranged in parallelism and slidable in bores $V^1$, $V^2$, and $V^3$ formed in the sections 15$^a$ and 15$^b$ of the casing. Intermediate the ends of inlet and exit plungers $V_1$ and $V_3$ reduced portions 27 and 28 are formed which provide chambers for the passage of fluid therearound. The surface of by-pass plunger $V_2$ is unrelieved for a purpose later to be explained.

The inlet and outlet conduits 20$^a$ and 20$^b$ of each rotor communicate with the valve cylinders $V^1$ and $V^3$ respectively and when all valve plungers are in the position shown in Fig. 8, fluid from the supply conduit enters port 25, around reduced portion 27, conduit 20$^a$ of rotor A only, to chamber 19$^a$ and propels the rotor A clockwise. The discharge fluid leaves chamber 19$^b$, through 20$^b$, around portion 28 of the outlet plunger $V_3$ to the exhaust port 26. The rotor A and spindle shaft 5 is thereupon driven at a relatively rapid rate, the rotors B and C turning idly in their respective cylinders.

So that the rotors B and C do not act as pumps or produce any lag upon the spindle the lower ends of the three valve plungers are arranged to uncover cross-ports 27$^a$ and 28$^a$ so that there is a free passage between the inlet and outlet chambers of these rotors.

A single control lever L controls the positioning of the triple plunger valve mechanism. As shown in Figs. 2 and 8 the upper end of the lever is secured to a shaft 32 journaled in the section 15$^a$ of the unit. Short levers 33$^a$ and 33$^b$ also connected to the shaft 32 have their free ends slidingly connected as at 34 with the valve rods $V_1$, $V_2$, and $V_3$ and thus when the control lever is oscillated the three valve plungers are reciprocated simultaneously. Spring detent means 35 associated with notches 36 on valve plunger $V_2$ serve as the retaining means for the valves.

The valves are illustrated in these figures in their extreme upward position whereupon only the rotor A is connected in the system. If the control lever L be actuated and the three valve plungers $V_1$, $V_2$, and $V_3$ lowered one position the intake and discharge channels 20$^a$ and 20$^b$ of the rotor B are also connected into the system in parallel with the rotor A. In this position the by-pass valve plunger $V_2$ closes or stops the flow in the cross-port 27$^a$ and isolates the intake and discharge channels of the rotor B.

Both of the rotors A and B now receive fluid from the common intake port 25 and since the volume of fluid supplied to the inlet port now drives two rotors instead of one, the rate of movement of the driven shaft is proportionately reduced.

When the valve plungers are moved downwardly to a third position, cross-port 28$^a$ is closed and the intake and discharge ports of rotor C are connected into the system, and a further major reduction in spindle speed results. Each reduction in spindle speed, it will be seen, is accompanied by an increase in the power output, firstly because of the increase in the area of the vanes of rotors B and C over the areas of the vanes of rotor A and secondly because of the increased lever arm of rotors B and C over the lever arm of rotor A. To facilitate movement of the plungers V₁, V₂, V₃ and to provide a drain for leakage, the lower ends of the chambers V¹, V², and V³ communicate with each other and with line 29 leading to the reservoir R. Any surplus oil accumulating in the upper or lower sections of the unit passes through conduits 30 and 31 to drain pipe 52.

From a practical standpoint a large number of rotors have certain disadvantages, for example, space limitations, weight, cost of manufacture etc., and to obviate such difficulties it is proposed to employ a fewer number of rotors and insert in one of the lines a device for throttling or regulating the rate of flow of the fluid therein. By adjusting the throttle various rates intermediate those accomplished by the selective coupling of the rotors may be effected with but little loss in power.

Fig. 9 illustrates diagrammatically one such type of hydraulic circuit for accomplishing that end. In this figure P represents a pump or other normally constant source of fluid, usually oil, and R a reservoir from which the pump derives its fluid through the line 40. The discharge side of the pump is connected by line 41 with a reversing valve RV which reverses the direction of flow in lines 42 and 43 connected with the ports 25 and 26 respectively of the motor unit.

With the reversing valve in the position indicated in Fig. 9 the propelling fluid passes through line 42 to the intake port 25 of the rotor unit M. The fluid leaving the motor passes back to the reverse valve through the line 43 and thence to the reservoir R by way of line 44.

When the reverse valve is moved to the other position (dotted line position in Fig. 9) line 43 is connected to line 41 and becomes the forward pressure line and the line 42 is connected with line 44 and becomes the return line.

For the purpose of effecting various rates of speed intermediate those produced by the selective coupling of the rotors, a throttling device T is embodied in the circuit, the function of which is to effect variations in the rate of flow of the liquid through the motor M. As illustrated, in the drawings, the throttling device T is preferably placed in an oil diverting conduit 45 connected with the forward pressure line 41 and in the present case, comprises a valve mechanism having a regulatable flow orifice. When the throttle T is closed, the entire discharge of the pump P, is caused to pass to the motor M, as hereinbefore explained. However, when the throttle T is wholly or partly opened a fraction of the pump discharge passes through the branch line 45 to the reservoir thereby diminishing the flow in the main branch 41ᵃ leading to the motor. In this way the volume of fluid supplied to the motor may be varied thereby to cause variations in its rate of movement.

Under normal conditions of operation the throttle T is set so as to offer a resistance to the flow in the branch line 45 substantially equal to the resistance encountered by the motor M so that the ratio of the flows in the two branches will remain constant.

By adjusting the resistance of throttle T the flow from the source P may be suitably apportioned between the two branches and since one of the branches conducts propelling fluid to the motor, the motor may be operated at various intermediate rates of speed.

As the percentage of the oil to be by-passed will be small, as compared with the amount utilized in driving the rotors the finer or intermediate speed changes are effected with but little loss in hydraulic power. It will be noted also that as more rotors are connected into the system, the percentage of the oil by-passed by reason of an adjustment of the throttle T, decreases. Consequently, when driving large tools at intermediate and low speeds, the power losses occasioned by by-passing a small percentage of the total volume supplied to the motor is comparatively slight. To guard against excessive pressures occurring in the system the relief valve r is provided.

Any suitable means, such as springs, cams etc., may, of course, be employed cyclically to project the vanes 21 of the rotors to their normal working position. I have preferred, however, to use hydraulic fluid pressure acting at the rear of the various vanes for accomplishing that purpose.

Referring more particularly to Figs. 2, 4, 6, and 7, the fluid entering the conduit 20ᵃ and slot 19ᵃ to drive the respective rotors forward also enters branch ports 46 which lead to arcuate passages 48 my way of radial passages 47. The arcuate passages 48 are disposed at the rear of the vanes and communicate with the chambers 20 behind the vanes. As represented in dotted lines in Figs. 4, 5, and 6, the arcuate ports 48 extend only part way around the surface of discs 18, beginning at a point slightly in advance of inclined wall 22' and ending a short distance beyond the end of the inclined wall. By this means fluid pressure supplied by the pump acts upon the inner ends of the vanes and forces them outwardly for starting rotation of the rotor and maintains each vane in its outer working position until its succeeding vane becomes effective. After this point is reached the chamber 20 of the first mentioned vane is cut off from the supply channel 48 and communicates with another set of annular channels 49 connected with the discharge conduit 20ᵇ. Thus, as the rotor advances and the blades are caused to recede, the fluid at the rear thereof is ejected into channels 49, thence through conduits 50 and 51 to the discharge conduit 20ᵇ. When the direction of rotation is to be reversed the conduit 20ᵇ becomes the high pressure conduit and the flow to the rear of the vanes is also reversed, as will be understood.

While the drawings illustrate the vanes of the respective rotors in the same angular position it will be understood, of course, that by staggering the rotors with respect to each other a continuous and more steady drive free of pulsations and vibratory effects, results.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements or equivalents thereof, by Letters Patent of the United States:—

1. An hydraulic transmission system for rotating a translatable spindle element combining, a plurality of constant displacement hydraulic motors of the rotary type operatively connected directly with said translatable element for rotating same, each of said rotary motors being of a different hydraulic displacement; a volumetrically constant source of hydraulic propelling medium; a liquid reservoir; a system of conduits between said source and said motors and said reservoir including a main supply conduit and a by-pass conduit connected therewith leading to said reservoir; a throttle valve in the by-pass conduit operative to apportion the flow from said constant source between said motors and said reservoir; selector valve means in said main conduit operative to connect one of said motors with said main supply conduit or two or more of said motors with said main supply conduit in parallel whereby said element is rotated at a rate inversely proportionate to the volumetric capacity of motor or motors connected into the system; and manually operable means for adjusting said throttle valve thereby to vary the flow of hydraulic medium directed to said motor or motors to effect a change in said rate.

2. An hydraulic transmission system for rotating a translatable spindle element combining, a plurality of constant displacement hydraulic motors of the rotary type operatively connected directly with said translatable element for rotating same; a volumetrically constant source of hydraulic propelling medium; a liquid reservoir; a system of conduits between said source and said motors and said reservoir including a main supply conduit and a by-pass conduit connected therewith leading to said reservoir, and a plurality of motor supply and a plurality of motor discharge conduits; a throttle valve in the by-pass conduit operative to divide the flow from said constant source between said motors and said reservoir; selector valve means in said motor supply and motor discharge conduits operative to connect one of said motors with said main supply conduit or two or more of said motors with said main supply conduit in parallel whereby said element is rotated at a rate inversely proportionate to the volumetric capacity of the motor or motors connected in the system; reversing valve means in said main supply conduit ahead of said selector valve means for reversing the direction of flow of hydraulic medium to the motor or motors connected in the system; and manually operable means for adjusting said throttle valve to vary the amount of hydraulic medium by-passed to the reservoir and thereby to vary the rate of rotation of said element in either direction of rotation.

3. An hydraulic transmission system for rotating a translatable element of a machine tool combining a plurality of constant displacement rotary hydraulic motors mounted directly upon the element to be driven, each of said motors being of a different hydraulic displacement; a constant delivery pump for supplying liquid under pressure to said motors; a system of fluid conduits between said pump and said motors including a supply conduit and a plurality of motor conduits branching therefrom and control means for rendering one or more of said motors selectively effective to rotate said element comprising a selector valve means having a fluid connection with said supply conduit and a separate fluid connection with each of said motor conduits; a by-pass conduit of adjustable capacity connected with the supply conduit; and manual means for actuating said valve means to direct the pressure liquid from said source selectively through one of said motor conduits or through two or more of said motor conduits whereby said motor or motors are propelled at a rate inversely proportionate to the combined capacities of the motors receiving pressure medium from said volumetrically constant source.

4. An hydraulic transmission system for rotating a translatable spindle element combining, a plurality of constant displacement hydraulic motors of the vane type operatively connected directly with the translatable element for rotating same, each of said motors being of a different hydraulic displacement; a normally constant source of hydraulic propelling medium; a system of conduits between said source and said motors comprising a main supply conduit; a by-pass conduit connected therewith, a normally fixed orifice throttle valve in the by-pass conduit operative to by-pass a fraction of the flow from said main supply conduit; a selector valve means in said main conduit for directing the other fraction of the flow of hydraulic medium selectively to one or more of said motors simultaneously whereby said element is rotated at a rate inversely proportionate to the volumetric capacity of the motor or motors receiving hydraulic medium from the said main conduit; and means for adjusting the size of the orifice in said throttle valve to vary the fraction of hydraulic medium by-passed thereby to vary the fraction supplied to said motor or motors.

5. An hydraulic transmission system for rotating a translatable machine tool element combining a plurality of constant displacement rotary hydraulic motors of the vane type connected directly to said translatable element for rotating same; a normally constant source of hydraulic propelling medium; a system of conduits between said source and said motors including a main supply conduit, a plurality of motor supply conduits branching therefrom and a by-pass conduit; a throttle valve in the by-pass conduit operative to by-pass a fraction of the flow of pressure medium from said main supply conduit, a selector valve means in said main conduit at the junction of said motor conduits for directing the flow of hydraulic medium to one of said motors or to two or more of said motors whereby said element is rotated at a rate inversely proportionate to the motor or motors receiving said fractional part of said main supply of hydraulic medium.

6. An hydraulic transmission system for rotating a translatable spindle element at various rates of speed and selectively in reverse directions combining a plurality of constant displacement hydraulic motors of the rotary type mounted directly upon with the element to be rotated, each of said motors being of a different hydraulic displacement; a constant delivery pump for supplying hydraulic medium under pressure; a system of fluid conduits between said pump and said motors including a main supply conduit, a motor supply conduit for each motor and a motor discharge conduit for each motor; selector valve means in said main supply conduit, fluid connections between said valve and each of said motor supply conduits; means for actuating said valve to direct the fluid from said main supply conduit selectively through one or more of said motor supply conduits thereby to effect rotation of said motor and element connected therewith in a forward direction at a rate inversely proportionate to the volumetric capacities of the motors supplied with the hydraulic medium; a by-pass conduit of adjustable capacity connected with the main supply conduit; reversing valve means communicating with said main supply conduit ahead of said selector valve means for directing the flow of the hydraulic medium in the reverse direction through said motor or motors connected in the system thereby to effect rotation of said element in a reverse direction at a rate commensurate with the capacities of the motors receiving said supply of hydraulic medium.

7. An hydraulic system for rotating a translatable spindle element at various rates of speed and selectively in reverse directions combining a plurality of selectively operable constant displacement hydraulic motors of the rotary type having a splined connection directly with the translatable element to be rotated; a constant delivery pump for supplying hydraulic medium under pressure; a system of fluid conduits between said pump and said motor including a main supply conduit, a motor supply conduit and a motor discharge conduit; a direction control valve in said main supply conduit having connections with said motor supply and motor discharge conduits operative to direct the fluid from said main supply conduit selectively through one of said motor conduits to effect rotation of said motor and element connected therewith selectively in a forward or a reverse direction; and a by-pass valve means communicating with said main supply conduit ahead of said control valve means for by-passing a fraction of the flow of the hydraulic medium supplied by said constant delivery pump from said motor thereby to control rate of motor movement in either direction.

8. An hydraulic system for rotating a translatable spindle element at various rates of speed and selectively in reverse directions combining a plurality of constant displacement hydraulic motors of the rotary type mechanically connected directly with the element to be rotated, each of said motors being of a different hydraulic displacement; a constant delivery pump for supplying hydraulic medium under pressure; a system of fluid conduits between said pump and said motors including a main supply conduit, and a motor supply conduit and a motor discharge conduit for each of said motors; valve means at the inlet and outlet side of each of said motors, operative to connect one or more of said motors with said supply of hydraulic medium; a by-pass conduit of adjustable capacity connected with the main supply conduit; a direction control valve in said main supply conduit having connections with said first mentioned valve means operative to direct the fluid from said main supply conduit through said motors to effect rotation of said motors and element connected therewith selectively in a forward or a reverse direction; liquid passage means normally establishing liquid communication between the inlet and outlet sides of each of said motors; and means rendering said liquid passage means ineffective as the related motor affected thereby is connected into the system by said first mentioned valve means.

LAWRENCE LEE SCHAUER.